United States Patent [19]

Lloyd

[11] Patent Number: 5,033,757
[45] Date of Patent: Jul. 23, 1991

[54] TROLLEY

[76] Inventor: Gerald E. Lloyd, 22 Cumnor Hill, Oxford, United Kingdom, OX2 9HA

[21] Appl. No.: 535,732

[22] Filed: Jun. 8, 1990

[30] Foreign Application Priority Data

| | | |
|---|---|---|
| Jun. 10, 1989 [GB] | United Kingdom | 8913422 |
| Oct. 20, 1989 [GB] | United Kingdom | 8923913 |
| Jan. 13, 1990 [GB] | United Kingdom | 9000798 |

[51] Int. Cl.⁵ .................................................. B62B 3/00
[52] U.S. Cl. .............................. 280/33.992; 280/47.16
[58] Field of Search ..................... 280/33.991, 33.992, 280/33.994, 33.997, 47.16, 47.34, 79.11, 79.2

[56] References Cited

U.S. PATENT DOCUMENTS

| | | | |
|---|---|---|---|
| 2,935,331 | 5/1960 | Ledgerwood | 280/47.16 X |
| 4,826,186 | 5/1989 | Hagelin | 280/47.16 X |
| 4,861,049 | 8/1989 | Losi | 280/47.16 |

Primary Examiner—Andres Kashnikow
Assistant Examiner—Michael Mar
Attorney, Agent, or Firm—Davis, Bujold & Streck

[57] ABSTRACT

A trolley has a pair of front and a pair of rear wheels disposed symmetrically on a chassis relative to a longitudinal axis thereof for ground engaging rotation in a common plane. The chassis incorporates a guide wheel located intermediate the front and rear wheels for ground engaging rotation about a horizontal lateral axis disposed at right angles to the longitudinal axis; a mounting for the guide wheel comprising an arm having a first end, a seocnd end and a section intermediate these ends, the first end bearing the guide wheel; the intermediate section incorporating an attachment to the chassis enabling the guide wheel to be displaced angularly about an axis parallel to the lateral axis, a resilient loading mechanism acting to resiliently bias the guide wheel, by way of the mounting, downwardly into ground engagement in the common plane; and a raising device for the guide wheel acting by way of the mounting such that, on the trolley being closely stacked with a similar trolley, the raising device causes the guide wheel to be raised out of ground engagement.

4 Claims, 5 Drawing Sheets

TROLLEY

This invention relates to a trolley. It is particularly concerned with a trolley of a general type extensively utilised in supermarkets, warehouses, airport termini and other locations for use and propulsion by pedestrians wishing to transfer loads such as purchases, luggage or equipment from one location to another.

A typical general trolley of this type takes the form of a raised basket secured to a chassis which is supported by four wheels or castors. The basket is provided with a handle whereby the trolley can be propelled by the user. The basket is disposed at a height comparable with or greater than the spacing between the front or rear pair of wheels. This enables objects to be readily placed into and removed from the basket without the need for an excessive range of vertical movement by a user of average height. However the raised centre of gravity of a loaded trolley, for reasons which will be referred to later, can lead to handling difficulties.

Another type of general trolley in widespread use comprises a load carrying platform mounted on a chassis and positioned closely above front and rear pairs of wheels. This low platform type of trolley is for use in builders suppliers and other locations involving the transport of bulky and/or heavy loads such as planks, pipes, sheets or rolls of material or bags of powdered or particulate material. A low platform for such loads provides for a low loading height and for the centre of gravity of the combined load and trolley to be maintained as low as possible.

A typical general trolley, whether of the basket or low platform or of some other type, has two front and two rear wheels. The wheel layout can be with the wheels at the corners of a rectangular pattern. A common alternative is for the normally leading pair to be mounted on a narrower wheel track thant the rear pair. At least the rear wheels are generally mounted on offset trailing pivots so that in pushing the trolley forwardly the trailing pivots ensure their associated wheels swing into a trailing position relative to the direction of movement.

A loaded trolley of conventional type with a high centre of gravity is difficult to push across a sloping floor since a resultant force acts to cause the trolley to crank about an axis perpendicular to the slope so that the trolley lies at an angle to the desired direction of travel if this is not directly up or down the slope. Manoeuvering a loaded trolley on a slope can is particularly difficult for a user who is poorly co-ordinated, weak or infirm. The situation can be aggravated with an ill-maintained trolley which has at least one wheel which either does not readily rotate about its horizontal axes of symmetry or, in the case of a castor action wheel does not readily swing to follow a trailing alignment.

According to the present invention there is provided a trolley having a pair of front and a pair of rear wheels disposed symmetrically on a chassis relative to a longitudinal axis thereof for ground engaging rotation in a common plane characterised in that the chassis incorporates:

(a) a guide wheel located intermediate the front and rear wheels for ground engaging rotation about a horizontal lateral axis which axis is disposed at right angles to the longitudinal axis;

(b) a mounting for the guide wheel comprising an arm having an inboard end, an outboard end and a section intermediate the inboard and outboard ends, the outboard end bearing the wheel; the intermediate section incorporating an attachment to the chassis enabling the guide wheel to be displaced angularly about an axis parallel to the lateral axis;

(c) a resilient loading means acting to resiliently bias the guide wheel, by way of the mounting, downwardly into ground engagement in the common plane; and (d) a raising means for the guide wheel acting by way of the mounting such that, on the trolley being closely stacked with a similar trolley, the raising means causes the guide wheel to be raised out of ground engagement.

According to a first preferred form of the present invention the trolley is characterised in that the mounting includes, or comprises, the resilient loading means.

According to a second preferred form of the present invention or the first preferred version thereof the trolley is characterised in that the arm is a trailing arm (relative to the normal direction of travel of the trolley) with the inboard end being the leading end of the arm and the outboard end the trailing end of the arm.

According to a third preferred form of the present invention or the first preferred version thereof the trolley is characterised in that the arm is a leading arm (relative to the normal direction of travel of the trolley) with the inboard end being the trailing end of the arm and the outboard end the leading end of the arm.

According to a fourth preferred form of the present invention or any preceding preferred form thereof the trolley is characterised by manoeuvering means whereby the guide wheel can be raised out of the common plane to enable at least a part of the trolley to pivot laterally without restraint by the guide wheel. Preferably the manoeuvering means is at least in part embodied by the raising means.

According to a fifth preferred form of the present invention or any preceding preferred form thereof a trolley is characterised by a load carrying platform disposed above the pairs of front and rear wheels by an amount comparable with or greater than the spacing of wheels in one or other pair.

According to a sixth preferred form of the present invention or the first second third or fourth preferred forms a trolley is characterised by a load carrying platform disposed above the pairs of front and rear wheels by an amount less than the least spacing of wheels in one or other pair.

According to a seventh preferred form of the present invention or any preceding preferred form thereof the trolley is characterised by a detent incorporated in the mounting or an extension thereof incorporates a detent so that in the event of loading on the guide wheel exceeding a predetermined amount the detent acts to release the mounting or the extension thereof so that the guide wheel can rise out of ground engagement in the common plane.

Broadly the trolley of the invention provides for the guide wheel to be located at a point about which the trolley can be rotated on a vertical axis. The guide wheel is located on the end of a trailing, or leading, arm attached to the trolley. The arm maintains the wheel in contact with the ground by way of a resilient element (such as a compression or tension spring) acting on the arm or by way of a resilient element such (as a leaf spring) incorporated in, or comprising, the arm.

Exemplary embodiments of the invention will now be described with reference to the accompanying drawing of chassis for a supermarket trolley of which:

FIRST EMBODIMENT

Figure 1:
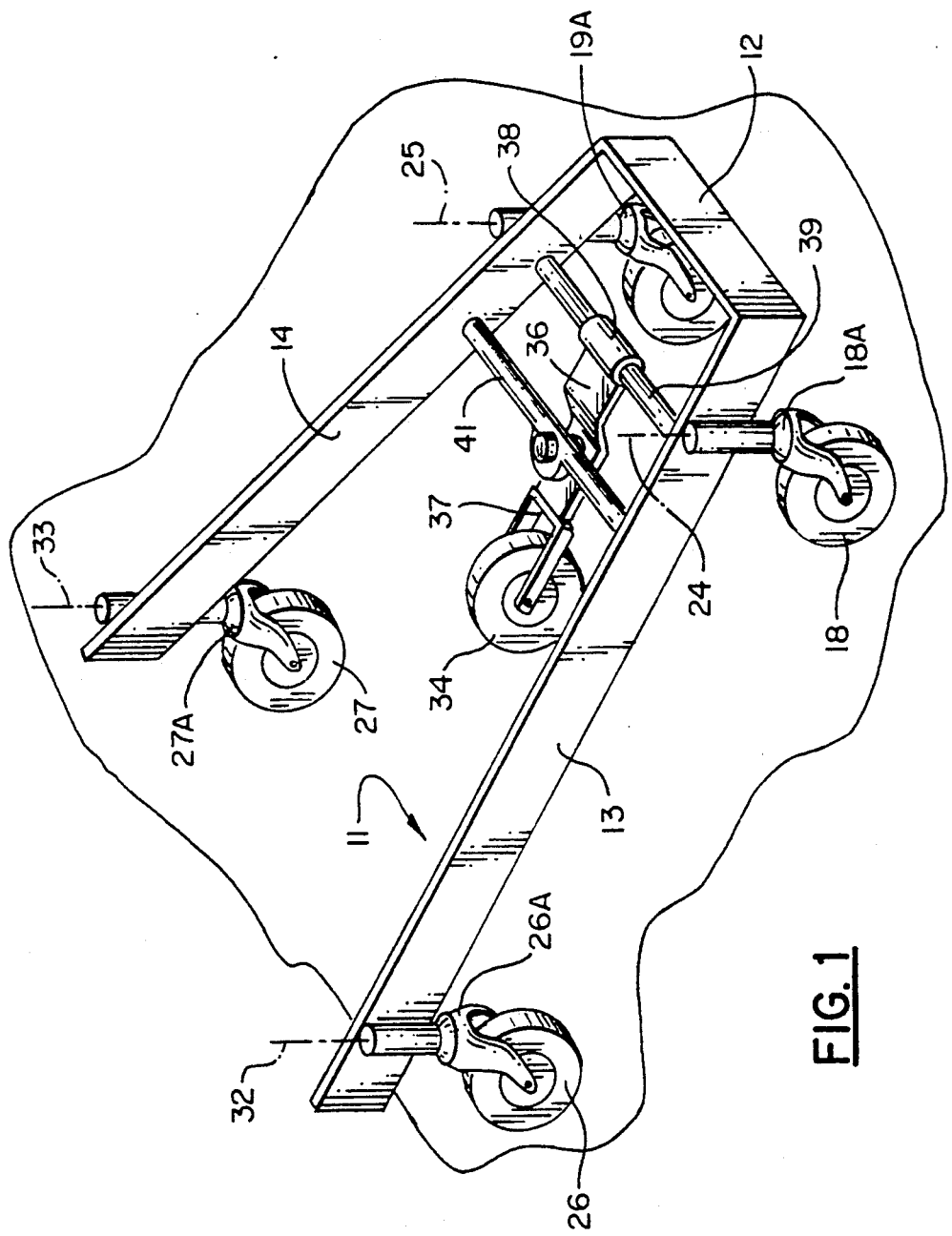
FIG. 1 is a perspective view of a chassis for a first embodiment.
Figure 2:
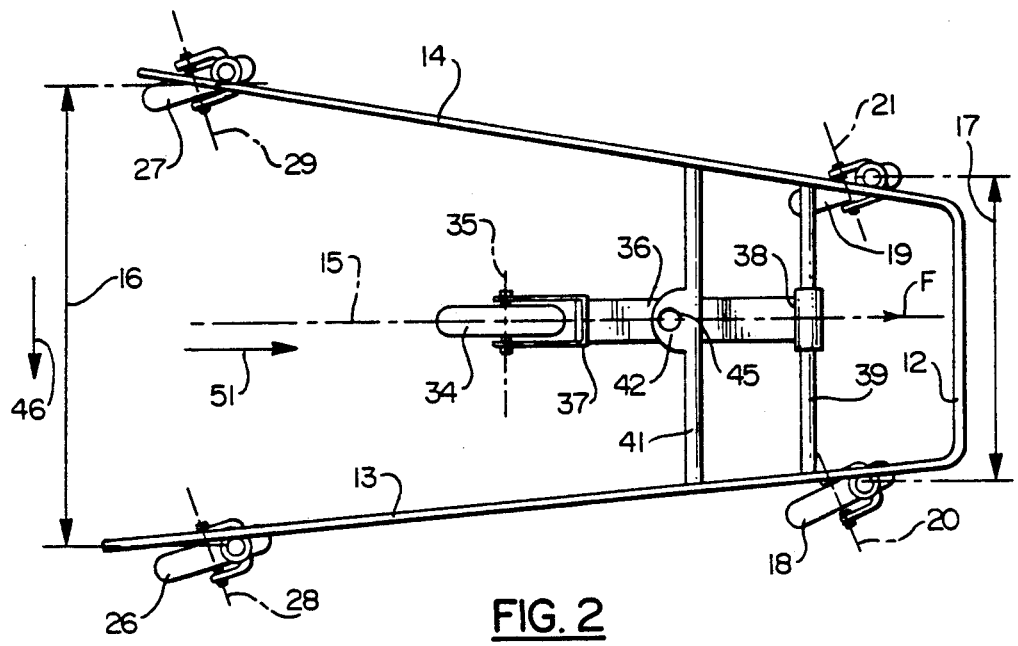
FIG. 2 is a plan view of the chassis shown in FIG. 1.

FIGS. 1 and 2 show chassis 11 and running gear of a supermarket trolley. The chassis has mounted in a known way above it a loading basket and handle which, being of conventional type, are not further described. The chassis has a front transverse section 12 and side arms 13, 14 which are splayed outwardly so as to lie symmetrically on either side of axis 15. The normal path of travel of the trolley is in direction F. Rear end spacing 16 of side arms 13, 14 is greater than front end spacing 17.

Front wheels 18, 19 are mounted in, respectively, carriers 18A, 19A for rotation about, respectively, individual horizontal axes 20, 21. The carriers 18A, 19A are adapted for castor action rotation about, respectively, vertical axes, 24, 25.

Rear wheels 26, 27 are mounted in, respectively, carriers 26A, 27A for rotation about, respectively, individual horizontal axes 28, 29. The carriers 28A, 27A are adapted for castor action rotation about, respectively, vertical axes 32, 33.

The front wheels 18, 19 and the rear wheels 26, 27 are located for ground engaging rotation in a common plane represented by the ground over which the trolley passes.

Guide wheel 34 is mounted for rotation about horizontal axis 35 on an arm, 36, in this case a trailing arm. The wheel 34 is located on trailing end 37 of the arm 36 whose leading end 38 is pivotably attached to a first cross-member 39 so as to be rotatable about horizontal axis 40 parallel to axis 35.

Figure 3:
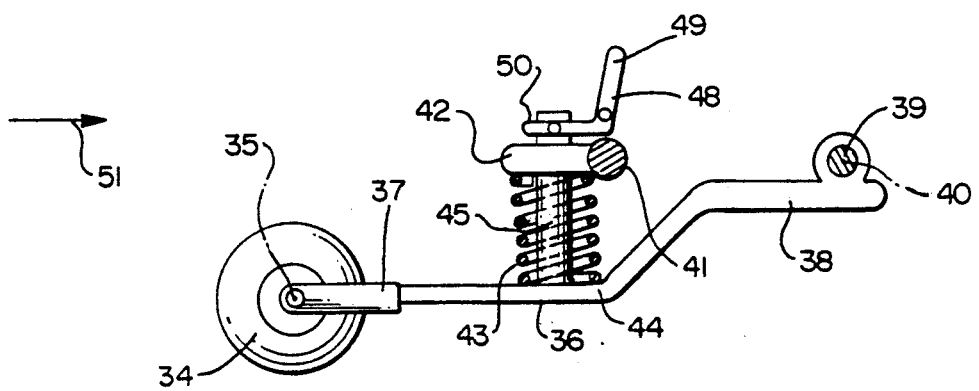
FIG. 3 is a side view of a part of the trolley shown in FIGS. 1 and 2, together with additional components not shown in those figures.

A second cross-member 41 is secured to the chassis behind first cross-member 39. FIG. 3 shows the second cross-member 41 on which is mounted a retainer 42 for one end of a compression spring 43 whose other end seats on an intermediate section 44 of trailing arm 36 between its trailing end 37 and leading end 38. The spring 43 is mounted on a center post 45 secured to the top side of section 44. Post 45 serves to resist lateral distortion of the spring 43 whatever its degree of expansion or compression. The spring 43 causes the guide wheel 34 to be resiliently loaded downwardly to ensure frictional contact between the wheel 34 and the ground over which it passes regardless of the load carried by the trolley. The guide wheel is normally intended for ground engagement in the common plane of the front and rear wheels as mentioned earlier.

The linkage between wheel 34 and remainder of the chassis 11 ensures that while the wheel 34 can readily rotate about axis 35 and by way of arm 36 about an axis parallel to axis 35 about which leading end 38 of the arm pivots. The wheel 34 resists any attempt to move displace it in any direction transverse the direction F of travel. This contrasts with the remaining wheels 18, 19, 26, 27 which in addition to rolling about their horizontal axes (respectively axes 20, 21, 28, 29) can freely pivot about vertical castor axes (respectively axes 24, 25, 32, 33).

The guide wheel 34 is disposed on the chassis 11 to lie approximately midway between the front and rear wheels at a point approximately beneath the centre of gravity of the trolley which tends to have the same fore and aft location whether the trolley is empty or (uniformly) loaded. The basket is located on the chassis some way above the ground plane on which wheels 18, 19, 26, 27 roll.

With the trolley loaded and pushed in the direction of arrow F, and with the guide wheel 34 in contact with the ground, the guide wheel 34 serves to resist lateral displacement of the trolley. To turn the trolley to the left (as seen in FIG. 2) the handle of the trolley while continuing to be pushed is drawn appropriately to the right as shown by arrow 46 so causing a moment of force to act made up of the force applied to the handle and the distance between the handle and the vertical axis of the guide wheel 34. Given the steering action referred to the carriers 18A, 19A, 26A, 27A take up positions as shown so that their associated wheels follow the required track while providing support for the trolley. The guide wheel 34 is located at the approximate centre of the trolley so that when the trolley is rotated about a vertical axis the guide wheel will serve as a pivot centre for the turning trolley.

Once travelling forwardly in a straight line again the fixed tracking effect of the guide wheel 34 ensures that any tendency on the part of trolley chassis to drift sideways under lateral loading is resisted by the frictional contact between wheel 34 and the ground. Such drifting can arise with a heavily loaded trolley in passing over an inclined floor especially if aggravated by the effect of one or more non-compliant wheel carriers.

In the event the trolley is located close to an obstacle parallel to the longitudinal axis of the trolley the guide wheel would act to resist an attempt by a user to readily manoeuver away from the obstacle. To enable the guide wheel to be lifted clear of the ground a manoeuvering means is provided embodied by a hand lever on the trolley coupled to the mount for the guide wheel so that on operating the hand lever the guide wheel is raised from out of the common plane and in particular out of ground engagement. Release of the hand lever once clear of the obstacle results in the guide wheel dropping back in the common plane to re-engage with the ground.

A stability problem can arise when the trolley ceases to be supported, as it normally is, in the common plane on a quadrangular or trapezoidal layout of four wheels namely front wheels 18, 19 and rear wheels 26, 27. The situation can arise where the trolley is supported in the common plane on a triangular layout made up of the guide wheel 34 and either of the front or the rear wheel pairs. Such a triangular layout can arise for example when the trolley is pushed forwardly over a kerb. Once the front wheels 18, 19 no longer support the trolley the weight of the trolley will be supported by the guide wheel 34 and the two rear wheels 21, 27. Until the guide wheel has also passed over the kerb edge the trolley wheels cannot be restored to the normal quadrangular arrangement in the common plane. However on the guide wheel reaching and passing over the kerb edge the front of the trolley will drop and the forces arising on the guide wheel hitting the ground and supporting the trolley can result in an un-uniformly loaded trolley tipping sideways to an extent that even though a front wheel thereafter contacts the ground the trolley is nevertheless overset.

SECOND EMBODIMENT

Figure 4:
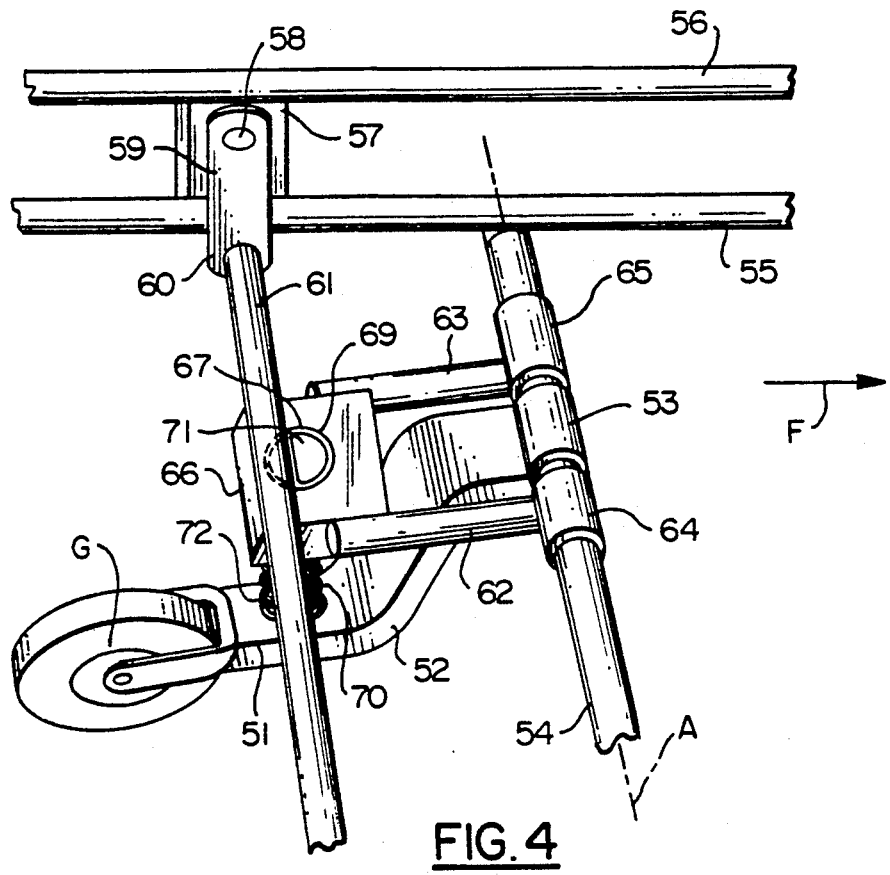
FIG. 4 is a perspective view of a chassis for a second embodiment.
Figure 5:
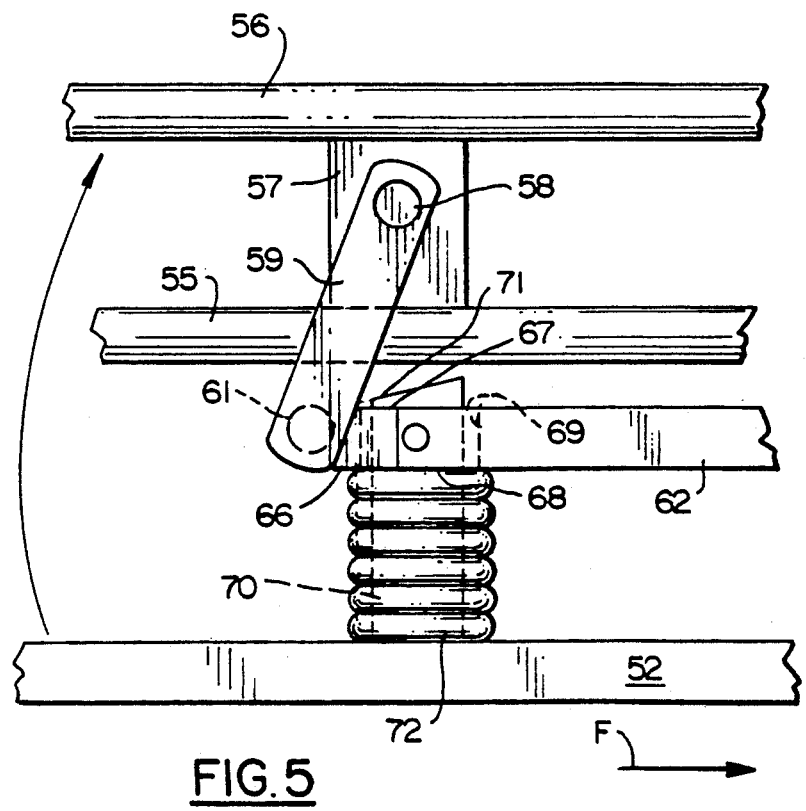
FIG. 5 is a side view in the direction of arrow V of FIG. 4 showing components of FIG. 4 in different relative positions to those shown in FIG. 4.

FIGS. 4 and 5 show an arrangement for a trolley of a type similar to that described in connection with FIGS. 1 to 3 but further adapted so as to increase stability. Components appearing in both figures are identified by the same reference character even though there may be a change in their relative position between the figures.

Guide wheel G is mounted at one end 51 of a trailing arm 52 which is pivotably mounted by way of an integral sleeve 53 about axis A of a cross-member 54 secured to lower longitudinal side member 55 of a supermarket trolley chassis. The trolley normally travels forwardly in the direction of arrow F. Extending upwardly from lower side member 55 to upper side member 56 is a block 57 on which is pivotably mounted on pivot 58 one end of a link 59. End 60 of link 59 has secured to it one end of a floating cross member 81 whose other end is mounted in a similar way on a link on the other side of the trolley.

Arms 62, 63 are mounted at their leading ends respectively ends 64, 65, by sleeves on cross member 54 for rotation about axis A. Trailing ends of the arms 62, 63 are secured to block 66 which has an upper face 67, a bottom face 68 and a bore 69 extending through it.

Trailing arm 52 has mounted on it a pillar 70 which has an angled top face 71. The pillar 70 has mounted around it a compression spring 72.

In the working position shown in FIG. 4 the floating cross member 61 is located with link 59 vertical and the cross member 61 seats on top face 67 of the block 66 and serves as a detent serving to locate the block 66 vertically against the loading provided by the action of the upper end of spring 72 acting on lower face 68 of the block which serves as a stop for that end of the spring 72. In this position the angled top face 71 of the pillar 70 lies wholly within the bore 69 and the rate of the spring 72 is chosen so that with a loaded trolley running over a smooth horizontal surface the spring is not wholly compressed.

In the event that the guide wheel G is subjected to a shock load (as for example while supporting the weight of the trolley independently of the front wheels and falling from a curb edge onto a lower surface level) the spring 72 permits a degree of upward movement of the trailing arm 52 until the spring coils close. At this point the top of the pillar 70 has risen above the upper face 67 of the block 66 causing the angled top face 71 to strike the floating cross member 61 which is thereby cammed backwardly about pivot 58 so that the cross member 61 no longer acts as a detent acting on upper face 67 to the cross member 61 no longer acts as a detent acting on upper face 67 to limit vertical movement of the block 66 which can consequently rise pivoting by way of arms 62, 63 about axis A. The final position of the components following this displacement is shown in FIG. 5. As a result the guide wheel G no longer serves to support the weight of the trolley but merely retracts under the load of the trolley and tilts about the rear wheels until the weight of the front part of the trolley is supported by the front wheels.

THIRD EMBODIMENT

Figure 6:
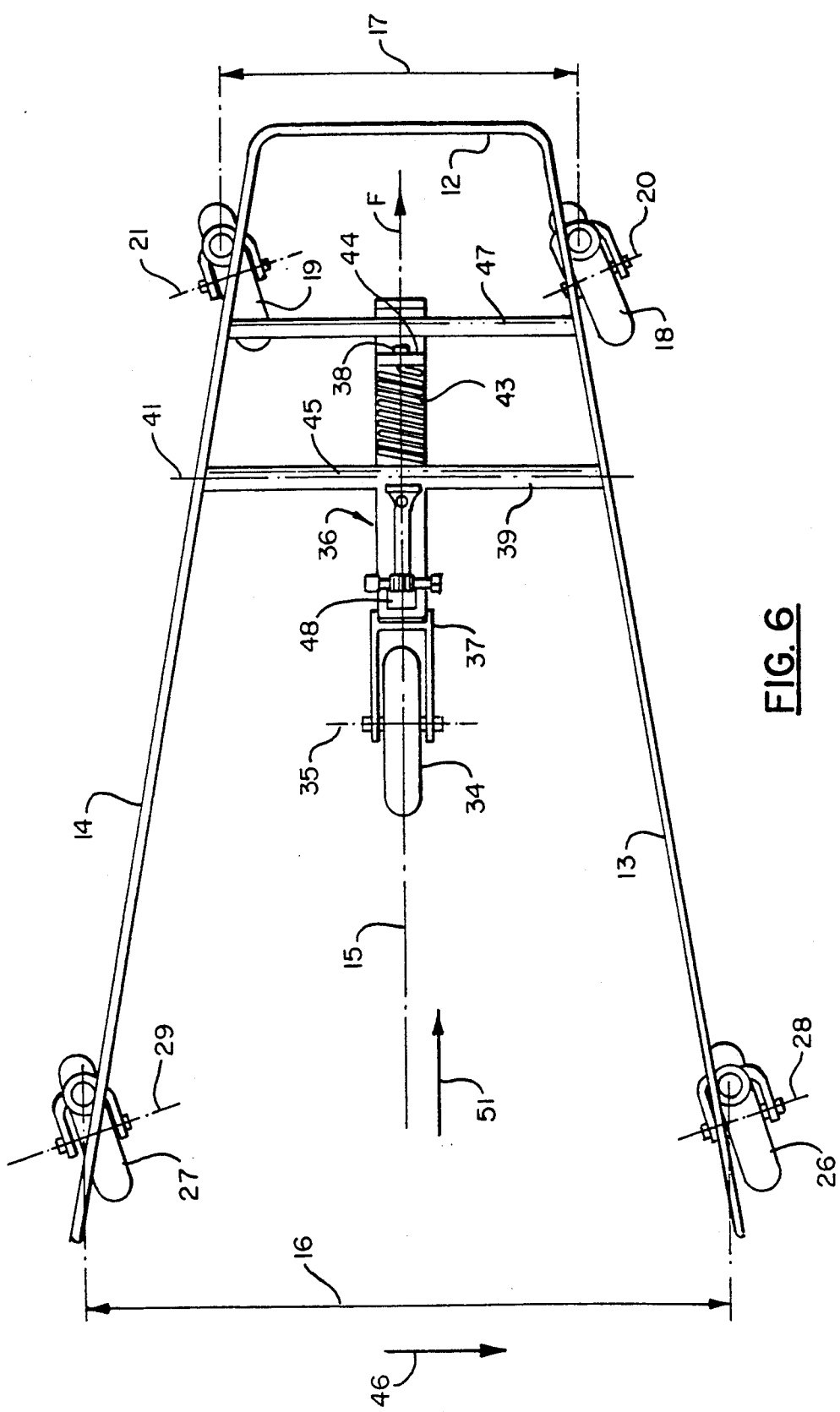
FIG. 6 is a plan view of a chassis for a third embodiment which is similar in many respects to FIG. 1.

FIGS. 6 shows a chassis 11 which is broadly similar to the chassis shown in FIG. 1 with some alternative arrangements. Components similar in from and function in FIG. 6 to those in FIG. 1 are given the same reference figures but are not further described.

Figure 7:
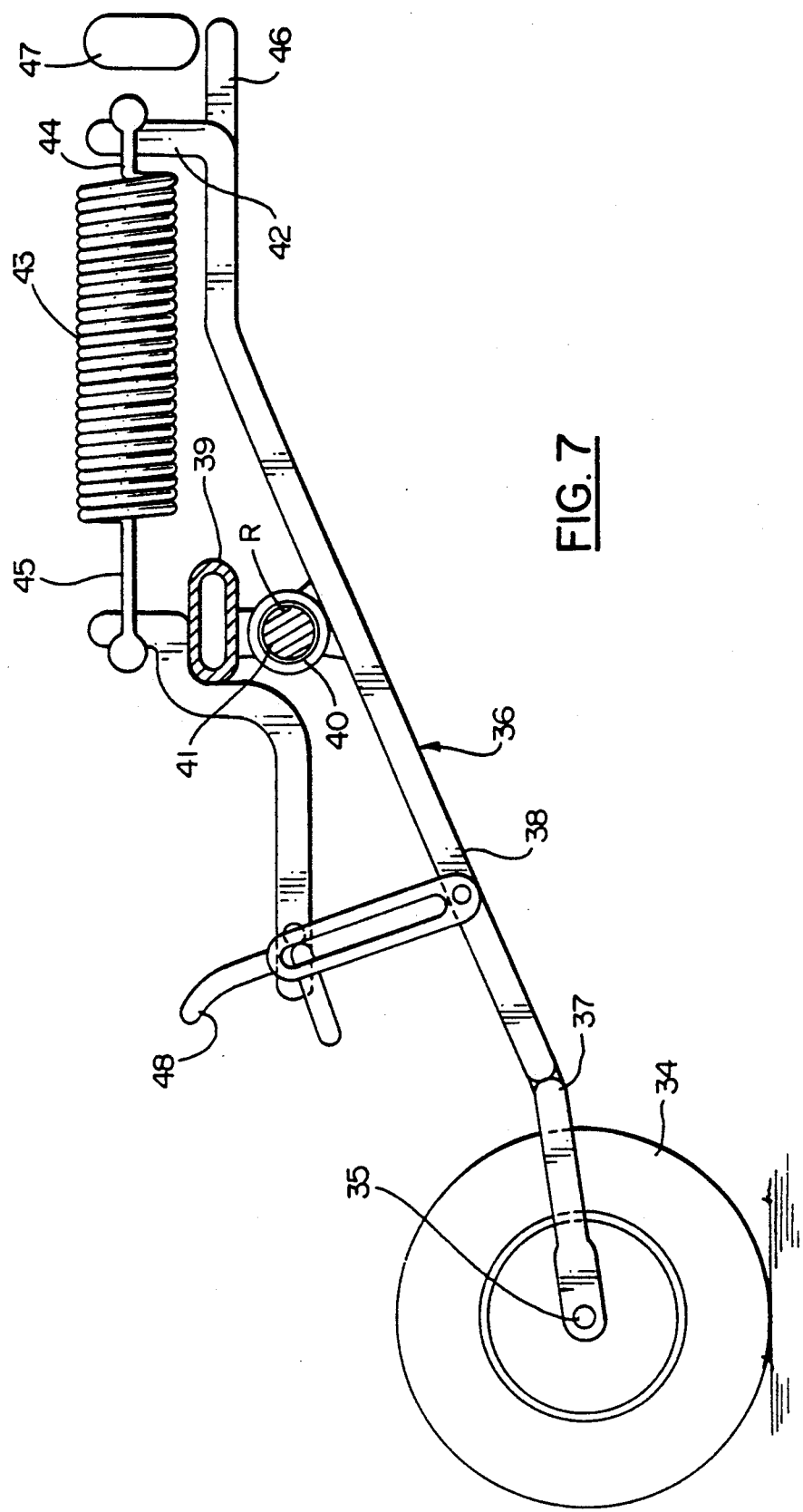
FIG. 7 is a side view of a part of the trolley shown in FIG. 6 together with additional components.

Guide wheel 34 is mounted for rotation about horizontal axis 35 on a trailing arm 36 and the guide wheel 34 and its connection to the remainder of the trolley will now be described in more detail with reference to FIG. 7. The wheel 34 is located on trailing end 37 of the arm 36. Intermediate section 38 of arm 36 is pivotably attached by way of an integral sleeve 40 to a rod R secured to cross-member 39. The arm 36 pivots by way of sleeve 40 so as to be rotatable about horizontal axis 41 parallel to axis 35.

Leading end 42 of the arm 36 is resiliently loaded way of a tension spring 43. Leading end 44 of the spring 43 is attached to the leading end 42 of the arm 36. Trailing end 45 of the spring 43 is anchored on cross-member 39. Projection 48 of leading end 42 provides for upward movement of the leading end 42 to be limited by front cross-member 47 of the trolley chassis.

The tension spring 43 causes the guide wheel 34 to be resiliently loaded so to ensure frictional contact between the wheel 34 and the ground over which it passes regardless of the load carried by the trolley. The guide wheel is normally intended for ground engagement in the ground plane common to the front and rear wheels as mentioned earlier when the trolley is standing on a horizontal flat surface.

The linkage between wheel 34 and remainder of the chassis 11 ensures that while the wheel 34 can readily rotate about axis 35 and, by way of arm 36, about axis 41 it resists any attempt to move it in any other direction. This contrasts with the remaining wheels 18, 19, 26, 27 which in addition to rolling about their horizontal axes (respectively axes 20, 21, 28, 29) can freely pivot about vertical castor axes (respectively axes 24, 25, 32, 33).

As in the case of the first embodiment (FIG. 1) the guide wheel 34 is disposed on the chassis 11 to lie approximately midway between the front and rear wheels at a point approximately beneath the centre of gravity of the trolley which tends to have the same horizontal location whether the trolley is empty or when uniformly loaded. The basket is located on the chassis some way above the ground plane on which wheels 18, 19, 26, 27 roll.

With the trolley loaded and pushed in the direction of arrow F the guide wheel 34 serves to resist lateral movement of the trolley. To turn the trolley to the left (as seen in FIG. 1) the handle of the trolley while continuing to be pushed is drawn appropriately to the right as shown by arrow 46 so causing a moment of force to act made up of the force applied to the handle and the distance between the handle and the vertical axis of the guide wheel 34. Given the steering action referred to the carriers 18A, 19A, 26A, 27A take up positions as shown so that their associated wheels follow the required track while providing support for the trolley. The guide wheel 34 is located at the approximate centre of the trolley so that when the trolley is rotated about a vertical axis the guide wheel will serve as a pivot centre for the turning trolley.

In the event the trolley is located close to an obstacle parallel to the longitudinal axis of the trolley the guide wheel 34 would act to resist an attempt by a user to readily manoeuver away from the obstacle. To enable the guide wheel to be lifted clear of the ground a manoeuvering means is provided embodied by a hand lever on the handle of the trolley coupled by a linkage to lever 48 so that on operating the hand lever the guide wheel is raised upwardly from out of the common plane and in particular out of ground engagement. Release of the hand lever once clear of the obstacle results in the guide wheel dropping back in the common plane to re-engage with the ground.

CONCLUSION

A supermarket trolley can incorporate features to enable a number of such trolleys to be pushed together for nesting so providing for a reduced parking length for the nested trolleys. Apart from the tapered view in plan the rear end of each trolley is adapted to receive the front end of another by having a folding basket section which is raised out of the way as the front of the rear trolley is pushed into the rear of the front trolley. Such stacks are frequently subject to movement as a unit typically when individual trolleys are recovered from locations all around the market or in service areas for it such as a car park. In such cases there arises a need to be able to direct the stack so that it can be steered back to a storage location. This can be undertaken with conventional trolleys. However in the case of trolleys according to the present invention guide wheels of each trolley corresponding to wheel 34 would resist any tendency to steer the stack from movement in the direction of the longitudinal axis of the stack. To overcome this the trailing arm 36 is adapted to enable the guide wheel to be lifted clear of the ground.

In the first embodiment (FIGS. 1 to 3) the lifting means comprises an L-shaped lever 48 pivotably mounted at its centre on the second cross member 41. The lever 48 has an upward trip arm 49 and a crutch arm 50 pivotably attached to the centre post 45. To provide for stacking a second trolley is pushed into the left hand end of the trolley shown in FIG. 2 in the direction of the arrow 51. A cross member on the second trolley corresponding to front transverse section 12 strikes the trip arm 49 causing the lever 48 to pivot about its centre resulting in crutch arm 50 raising the centre post 45 against the action of the spring 43. As a result the trailing arm 36 raises the wheel 34 clear of the ground. Thereafter the stacked trolleys can be manoeuvered without the restraining effect of guide wheels corresponding to wheel 34. On the second trolley being pulled clear of the one shown the trip arm 49 is released so freeing crutch arm 50 and enabling centre post 45 to move downwardly under the action of the spring 43. Wheel 34 then contacts the ground to provide directional stability during movement of the trolley as described earlier.

A similar effect is obtained in the third embodiment (FIGS. 6, 7) by displacing lever 48 to raise the arm and so the wheel 34.

While the specific embodiment described in connection with FIGS. 1 to 3; or 4 and 5; or FIGS. 6 to 8 refer to a supermarket trolley it will be apparent that the invention is applicable to a range of trolleys intended for different types of load. Typically the proportions of the trolley can be adapted to optimize the ability of the trolley to support the load in the most effective manner which enables a guide wheel corresponding to wheel 34 or G to function in the manner previously described. Thus while a supermarket trolley is concerned with carrying a sometimes substantial load of small and medium size goods a trolley for carrying sheets or lengths of timber or wood or sheets or bars of metal or plastic material or pipework involves the provision of stable transport for unwieldy material. A trolley for this purpose is readily constructed according to the invention and includes a load carrying platform as close to the wheels as possible to keep the centre of gravity of a loaded trolley as low as possible.

All the embodiments refer to a trailing arm arrangement whereby the guide wheel providing for lateral resistance is mounted on the rear end of an arm whose leading end is mounted on the trolley. This arrangement has been found in practice to be an effective one. However the present invention envisages the use of a leading arm arrangement where the wheel providing for lateral resistance is on the leading end of an arm whose trailing end is mounted on the trolley. The arrangements for resiliently loading the arm and for lifting the arm to enable the lateral resistance wheel to be lifted so as to temporarily incapacitate it will be similar to those described.

In addition the arm described in he embodiments is a rigid one to which a resilient loading is applied by means such as a compression or a tension spring. Alternatively the arm itself, or at least a portion of it, can be formed from a resilient material such as a leaf spring. This will also serve to cut down on the number of separate components that need to be used in the course of fabricating the assembly.

What is claimed is:

1. A trolley having a pair of front wheels and a pair of rear wheels, each pair of wheels being disposed symmetrically on a chassis relative to a longitudinal axis thereof for ground engaging rotation in a common plane, said trolley being adapted to be horizontally stacked with similar trolleys characterized in that the chassis incorporates:
   (a) a guide wheel located intermediate the front and rear wheels for ground engaging rotation about a horizontal lateral axis which axis is disposed at right angles to the longitudinal axis;
   (b) a mounting for the guide wheel comprising an arm having a first end, a second end and a section intermediate said ends, said first end bearing the guide wheel; the intermediate section incorporating an attachment to the chassis enabling the arm with the guide wheel attached thereto to be displaced angularly about an axis extending parallel to the lateral axis;
   (c) a resilient loading means acting to resiliently bias the guide wheel, by way of the mounting, downwardly into ground engagement in said common plane; and
   (d) raising means including means on said mounting which is responsive to engagement with engagement means located on a similar trolley for automatically raising said arm, with said guide wheel attached thereto, out of ground engagement with said common plane when the trolley is being stacked with said similar trolley.

2. A trolley as claimed in claim 1 characterized in that the mounting includes, the resilient loading means.

3. A trolley as claimed in claim 1 characterized in that the arm is a trailing arm, relative to the normal direction of travel of the trolley, with the first end being the trailing end of the arm.

4. A trolley as claimed in claim 1 wherein said raising means includes means for manually raising said guide wheel out of the common plane to enable at least a part of the trolley to pivot laterally without restraint by the guide wheel.

* * * * *